United States Patent

Niermann et al.

[11] Patent Number: 5,944,604
[45] Date of Patent: Aug. 31, 1999

[54] ARRANGEMENT FOR PREVENTING TILTING OF LONGITUDINALLY DISPLACEABLE MACHINE SUBASSEMBLIES, IN PARTICULAR IN CHOPPER ATTACHMENTS OF COMBINE HARVESTERS

[75] Inventors: Martin Niermann, Harsewinkel; Dieter Strickmann, Beelen, both of Germany

[73] Assignee: Claas KGaA, Harsewinkel, Germany

[21] Appl. No.: 08/937,178

[22] Filed: Sep. 25, 1997

[30] Foreign Application Priority Data

Sep. 27, 1996 [DE] Germany .......................... 196 39 755

[51] Int. Cl.[6] .................................................. A01F 12/40
[52] U.S. Cl. ............................ 460/112; 460/116; 460/119
[58] Field of Search ............................. 460/112, 95, 111, 460/113, 116, 119, 150, 901

[56] References Cited

U.S. PATENT DOCUMENTS 3,824,871  7/1974  Loesch et al. .
4,669,489  6/1987  Schraeder et al. ...................... 460/112
5,501,635  3/1996  Niermann ................................ 460/112

FOREIGN PATENT DOCUMENTS 0 224 803 A1  12/1985  European Pat. Off. .
7131135 U      8/1971  Germany .

Primary Examiner—Terry Lee Melius
Attorney, Agent, or Firm—Michael J. Striker

[57] ABSTRACT

An arrangement for attaching a chopper to a combine harvester has two slide rails arrangeable on the combine harvester, a unit for suspending the chopper on the slide rails of the combine harvester, a unit for horizontally displacing the chopper and including a driven drive shaft having two ends each provided with a toothed gear, and a unit for preventing tilting of the chopper relative to the combine harvester during the horizontal displacement, the drive shaft being composed of two shaft parts having different lengths and each carrying a respective one of the toothed gears, and the shaft parts being radially adjustable relative to one another by a releasable connection so as to form the tilting preventing unit.

5 Claims, 3 Drawing Sheets

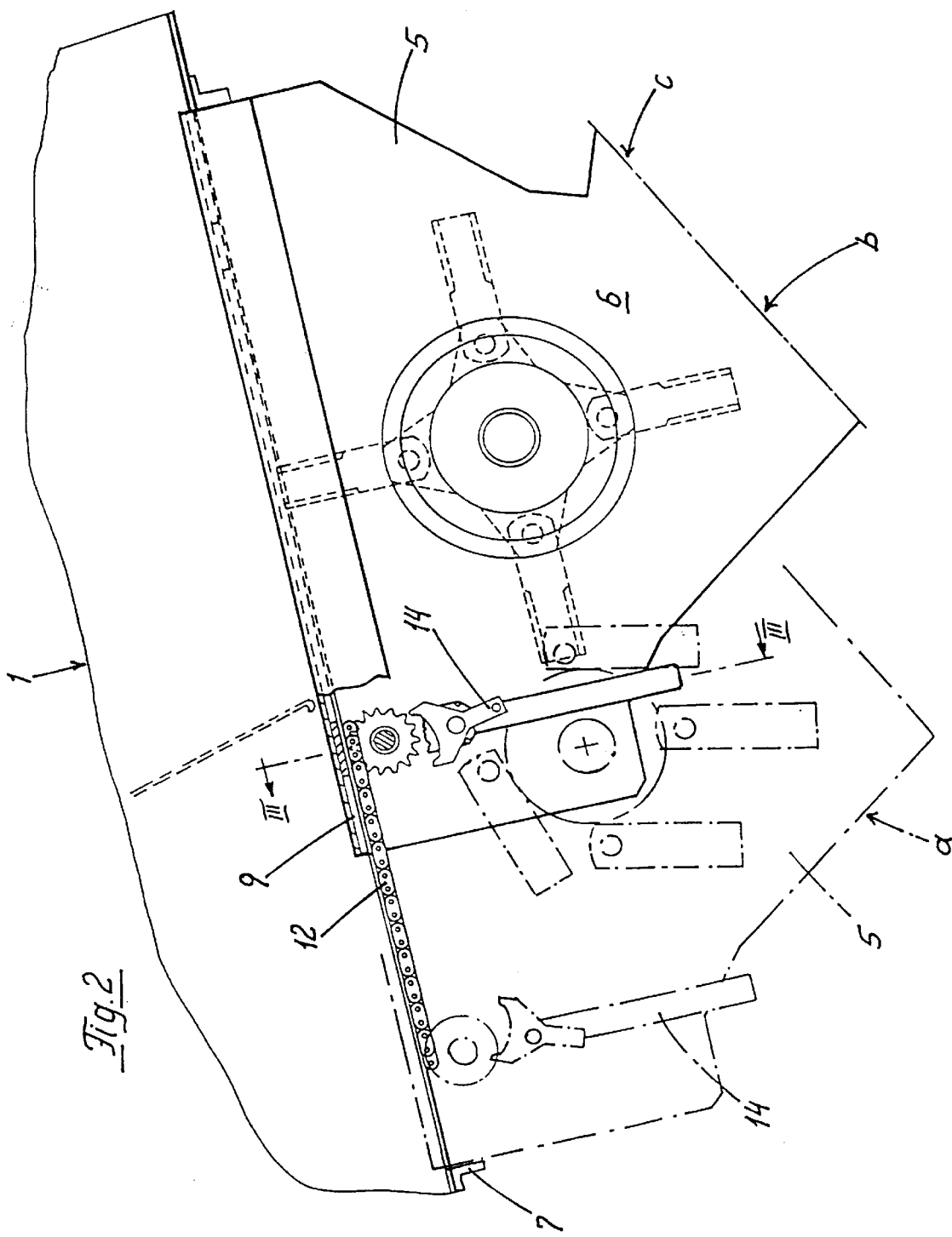

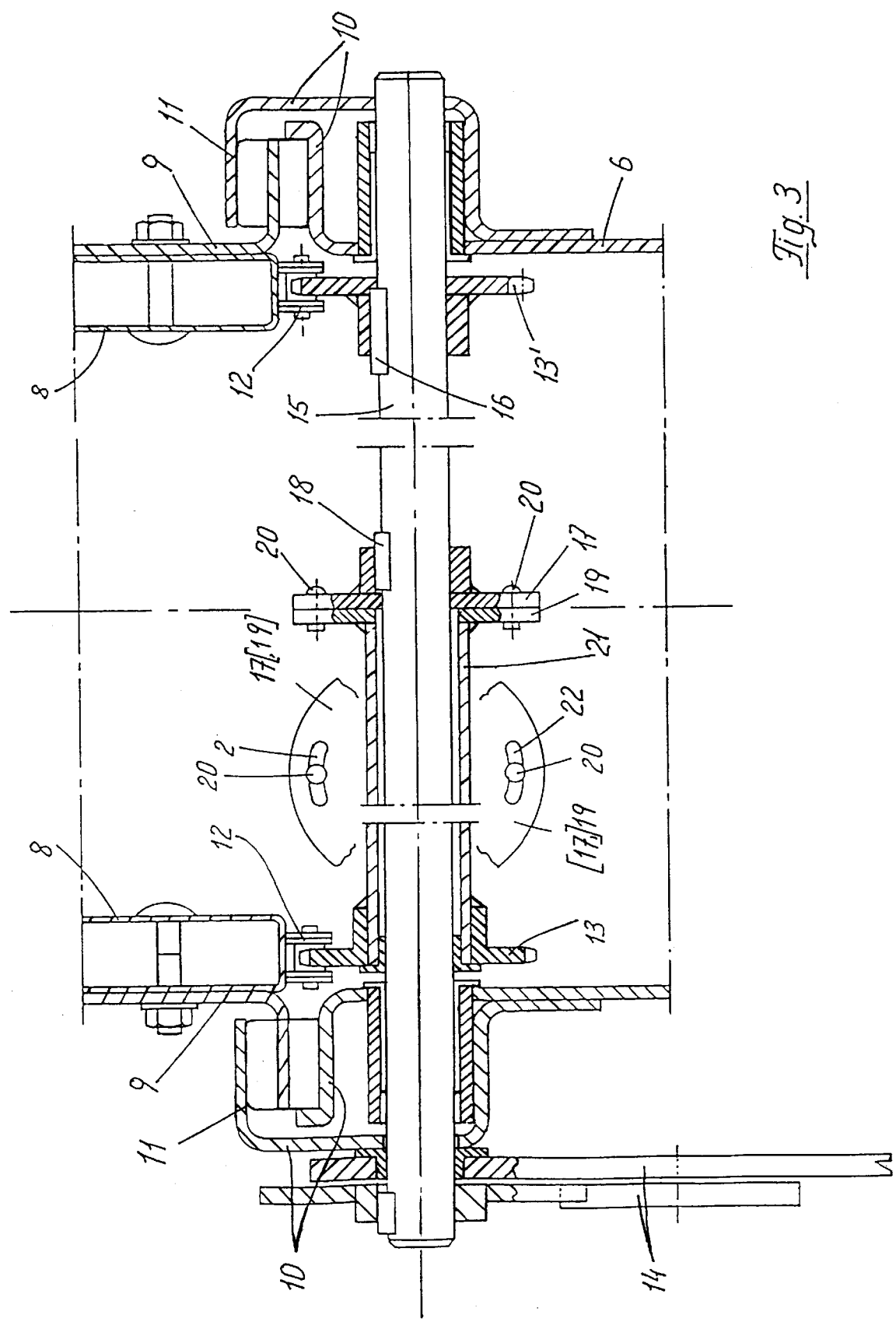

ARRANGEMENT FOR PREVENTING TILTING OF LONGITUDINALLY DISPLACEABLE MACHINE SUBASSEMBLIES, IN PARTICULAR IN CHOPPER ATTACHMENTS OF COMBINE HARVESTERS

BACKGROUND OF THE INVENTION

The present invention relates to arrangement for preventing tilting of longitudinally displaceable machine subassemblies, in particular in chopper attachments of combine harvesters.

More particularly, it relates to an arrangement for preventing tilting of longitudinally displaceable machine subassemblies in its guides, in particular for a chopper attachment of a combine harvester, which is suspended on two slide rails of the combine harvester and has a drive shaft which is driven at one side and provided with a toothed gear at each end side for horizontal displacement of the chopper.

European patent document EP-OS 22 48 03 discloses a chopper attachment for a combine harvester which is horizontally displaceably supported on sliding guides and is displaceable by a single shaft provided at each end side with a toothed gear. Because of mounting inaccuracies as well as torsion forces occurring during driving of the shaft, the both toothed gears often run not completely synchronously in the associated toothed racks, and disturbing tilting of the chopper in the slide guides occurs when the chopper is displaced.

SUMMARY OF THE INVENTION

Accordingly, it is an object of present invention to provide an arrangement which eliminates the disadvantages of the prior art.

In keeping with these objects and with others which will become apparent hereinafter, one feature of the present invention resides, briefly stated, in an arrangement of the above mentioned general type, in which shaft parts with different lengths are associated with both toothed gears and are radially adjustable relative to one another through a releasable connection.

When the arrangement is designed in accordance with the present invention, it eliminates the disadvantages of the prior art.

In accordance with another feature of the present invention, the toothed gear which faces away from the drive is fixedly connected with the end of a first through going shaft part, while the toothed gear which faces the drive is a fixed component of a hollow shaft through which said shaft part displaces. The hollow shaft extends substantially over a half length of the shaft part and is in a releasable rotary connection with the shaft part through a ring flange and screws provided on both parts.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a partial side view and a partial section of a suspension of the chopper on a housing of the combine harvester; and FIG. 3 is a view showing a section taken along the line III—III in FIG. 2.

DESCRIPTION OF PREFERRED EMBODIMENTS

Figure 1:
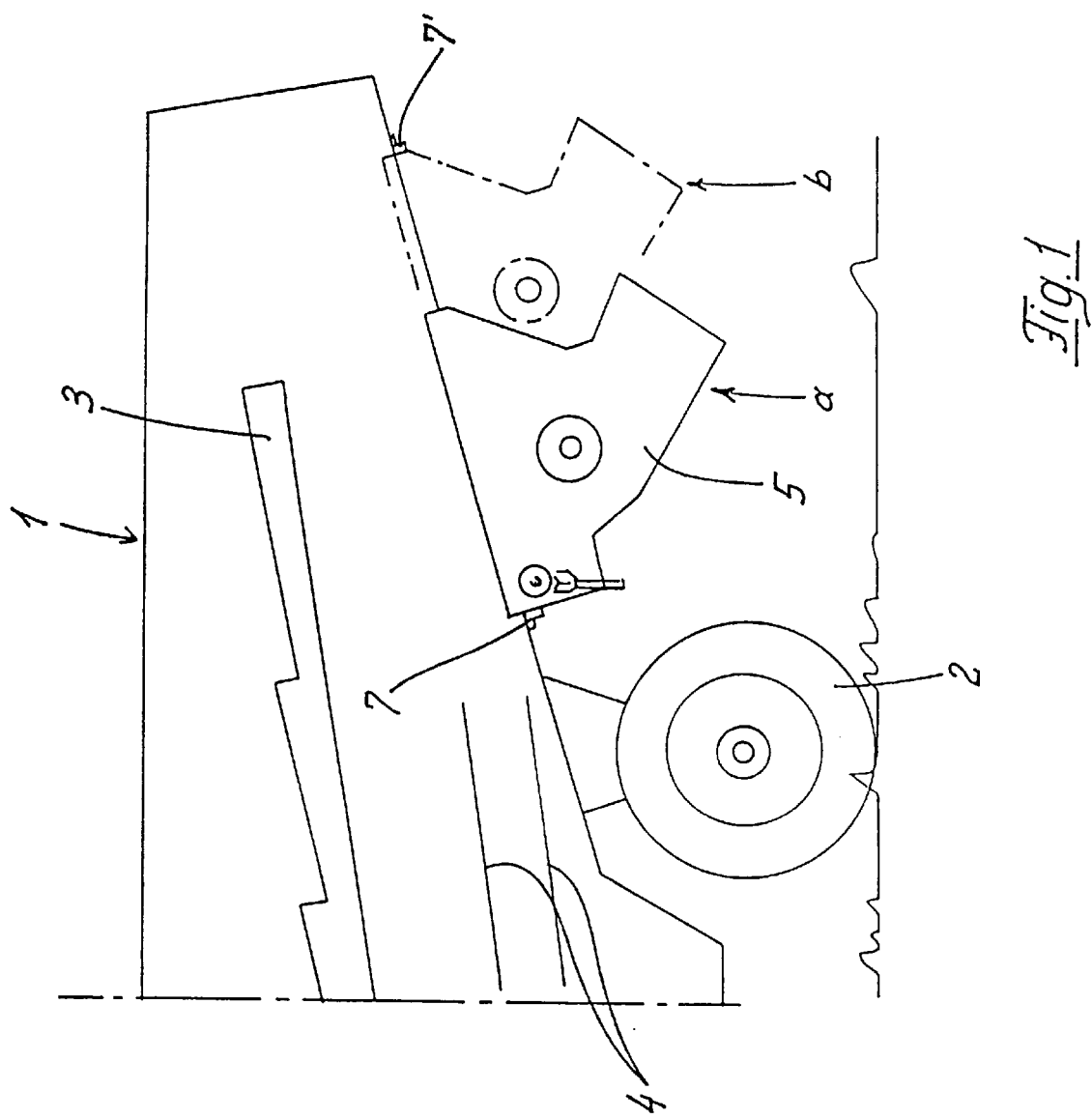
FIG. 1 is a side view of a discharge end of a combine harvester with an attached straw chopper.

FIG. 1 identifies a rear housing part of a combine harvester which is supported on rear steering wheels 2. A hurdle shaker 3 and cleaning sieves 4 are arranged in the rear housing part. An attached straw chopper is identified with reference numeral 5 and has side walls 6. The chopper 5 is displaceable from the position A shown in solid lines to the position B shown in dash-dot lines, so that the straw thrown from the shakers 3 can be either processed by the chopper or remains unchopped. The chopper 5 is movable so that in its extreme end positions B and C, it abuts against abutments 7 and 7' which are mounted on the housing 1 of the combine harvester.

The combine harvester has profiled frame members 8. Angled slide rails 9 are mounted on the profile members 8 and formed so that the side walls 6 of the chopper are displaceably suspended on the slide rails 9 through profile bands 10 and sliding blocks 11. Toothed racks or chain portions 12 are mounted on the lower side of the profiled frame members 8 and engage with toothed gears 13 arranged at both sides of the chopper 5. The toothed gears 13 are components of a two-part shaft which is supported in the side walls 6 of the chopper and is rotatable through a known ratchet transmission 14. Upon actuation of the ratchet transmission 14 the chopper 5 is displaced on the slide rails 9 of the combine harvester through the toothed portions 12 and the toothed gears 13, 13' in a longitudinal direction.

The shaft supported in the side walls 6 of the chopper is composed of a through going shaft part 15 which is provided with the toothed gear 13 at its end facing away from the ratchet transmission 14. The toothed gear 13 is fixedly connected with the shaft part 15 by a wedge 16 for joint rotation with the shaft part. A ring flange 17 is also fixedly connected with the shaft part 15 by a further wedge 18 substantially on a half length of the shaft part 15. A second ring flange 19 is connected with the flange 17 through a screw connection 20. The flange 19 is an end-side component of a hollow shaft 21. The hollow shaft 21 is fixedly connected with the toothed gear 13 at its end which adjoins the ratchet transmission 14. Both ring flanges 17 and 19 are provided with radial slots 22 on their periphery.

The radial slots 22 are designed so that the flanges can turn relative to one another by a predetermined magnitude, when the screw connection 20 is released. When the chopper 5 is moved against the abutment 7, 7' and the screw connection 20 is released and after this again restored, mounting inaccuracies can be compensated and a synchronism of the toothed gears 13 and 13' can be provided. Moreover, the torsion of the shaft part 15 during actuation through the ratchet transmission 14 influences the synchronism of the toothed gears 13, 13' only to a minimal degree.

It will be understood that each of the elements described above, or two or more together, may also find a useful application in other types of constructions differing from the types described above.

While the invention has been illustrated and described as embodied in arrangement for preventing tilting of longitudinally displaceable machine subassemblies, in particular in chopper attachments of combine harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for attaching a chopper to a combine harvester, comprising two slide rails positioned on the combine harvester; means for suspending the chopper on said slide rails on the combine harvester; means for horizontally displacing the chopper and including a drive shaft having two ends each provided with a toothed gear; drive means for driving said drive shaft; and means for preventing tilting of the chopper relative to the combine harvester during the horizontal displacement, said drive shaft being composed of two shaft parts having different lengths and each carrying a respective one of said toothed gears, and said shaft parts being radially adjustable relative to one another and releasably connectable with one another in adjusted positions so as to form said tilting preventing means; and means for releasably connecting said shaft parts with one another and operatively connected with said shaft parts.

2. An arrangement as defined in claim 1 wherein said shaft parts include a first throughgoing shaft part which carries one of said toothed gears facing away from said drive so that said one toothed gear is fixedly connected with an end of said first throughgoing shaft part, said shaft parts including a second hollow shaft part which is displaceable over said first throughgoing shaft part and supports the other of said toothed gears which faces said drive and forms a fixed components of said hollow shaft part.

3. An arrangement as defined in claim 2, wherein said second hollow shaft part extends substantially over a half length of said first throughgoing shaft part.

4. An arrangement as defined in claim 3, wherein said means for releasably connecting said shaft parts include two ring flanges each connected with a respective one of said shaft parts and screw means releasably connecting said ring flanges with one another.

5. An arrangement as defined in claim 4, wherein said flanges are provided with radial slots which coincide with one another during turning of said flanges relative to one another and through which said screw means pass.

\* \* \* \* \*